United States Patent
Harugaichi et al.

(10) Patent No.: US 11,807,095 B2
(45) Date of Patent: Nov. 7, 2023

(54) LOWER STRUCTURE OF VEHICLE HAVING PLANAR PROTECTOR AT INNER SIDE SURFACE OF BATTERY UNIT

(71) Applicant: Mazda Motor Corporation, Hiroshima (JP)

(72) Inventors: Shintaro Harugaichi, Hiroshima (JP); Sho Yoshida, Hiroshima (JP); Yosuke Sawada, Hiroshima (JP); Yasushi Ishikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 36 days.

(21) Appl. No.: 17/522,931

(22) Filed: Nov. 10, 2021

(65) Prior Publication Data
US 2022/0169112 A1 Jun. 2, 2022

(30) Foreign Application Priority Data
Nov. 27, 2020 (JP) ................................. 2020-197231

(51) Int. Cl.
*B60K 1/04* (2019.01)
*B60K 17/24* (2006.01)

(52) U.S. Cl.
CPC ................ *B60K 17/24* (2013.01); *B60K 1/04* (2013.01); *B60K 2001/0438* (2013.01)

(58) Field of Classification Search
CPC .. B60K 17/24; B60K 1/04; B60K 2001/0438; B60K 17/22; B60K 17/34; B60K 2006/4825; B60L 50/64; B60L 50/66
See application file for complete search history.

(56) References Cited

U.S. PATENT DOCUMENTS

| | | | |
|---|---|---|---|
| 2013/0075173 A1 | 3/2013 | Kato et al. | |
| 2015/0107921 A1* | 4/2015 | Naruke | B60K 1/04 180/68.5 |
| 2021/0101490 A1* | 4/2021 | Yang | B60K 1/04 |
| 2021/0245595 A1 | 8/2021 | Grace et al. | |

FOREIGN PATENT DOCUMENTS

| | | |
|---|---|---|
| JP | 2013-67334 A | 4/2013 |
| WO | 2021/224178 A1 | 11/2021 |

* cited by examiner

*Primary Examiner* — Jason D Shanske
*Assistant Examiner* — James J Triggs
(74) *Attorney, Agent, or Firm* — XSENSUS LLP

(57) ABSTRACT

A vehicle may include a propeller shaft that extends from a transmission toward a vehicle rear side and left and right battery units disposed below floor panels disposed on the left and right sides of a floor tunnel. The propeller shaft may include a first shaft portion connected to the transmission and a second shaft portion connected to the first shaft portion via a universal joint. The left and right battery units may have inner side surface portions that face the inner side in the vehicle width direction, respectively. Planar protectors that cover the portions of the inner side surface portions on the vehicle rear side of the universal joint may be mounted to the battery units, respectively.

15 Claims, 8 Drawing Sheets

LOWER STRUCTURE OF VEHICLE HAVING PLANAR PROTECTOR AT INNER SIDE SURFACE OF BATTERY UNIT

CROSS-REFERENCE TO RELATED APPLICATION

The present application claims priority to Japanese patent application JP 2020-197231, filed Nov. 27, 2020, the entire contents of which being incorporated herein by reference in its entirety.

TECHNICAL FIELD

The present disclosure relates to a lower structure of a vehicle.

BACKGROUND ART

Patent document 1 discloses an example of the lower structure of a vehicle. Specifically, patent document 1 discloses a vehicle including a propeller shaft that extends from the rear end portion of a transmission toward the vehicle rear and transmits power to the rear wheels, and battery packs disposed below the floor panels on the left and right sides of a floor tunnel.

According to patent document 1, the left and right battery packs are spaced apart in the vehicle width direction. In addition, the propeller shaft is laid out so as to be disposed between the left and right battery packs in the vehicle width direction, more accurately between the inner side surface portions of the battery packs.

PRIOR ART DOCUMENTS

Patent Documents

[Patent document 1] JP-A-2013-67334

SUMMARY

Problems to be Solved

By the way, the propeller shaft configured as described above may include two shaft portions connected to each other via a joint portion including a so-called universal joint or the like.

In this case, for example, when a gearbox moves backward at the time of a front collision of the vehicle, the propeller shaft is bent starting from the joint portion, whereby the gearbox can move backward more smoothly without suffering interference. The backward movement of the gearbox is effective in ensuring the crash stroke of the vehicle body.

However, when the propeller shaft is laid out between the left and right battery packs (referred to below as the "battery units") as described in patent document 1, since the joint portion with which the bending starts is displaced to the left and right while moving backward, this joint portion may come into contact with the battery units. Such contact is inconvenient because there is concern about damage to the battery units.

The present disclosure addresses the problem described above and/or other problems with an object of satisfactorily protecting the left and right battery units without interfering with the backward movement of the gearbox.

Means for Solving the Problems

A first aspect of the present disclosure relates to a lower structure of a vehicle in which a rear wheel serves as a drive wheel. The vehicle includes a gearbox disposed with at least a portion thereof present in a floor tunnel, the portion being present on a vehicle rear side; a propeller shaft that extends from the gearbox toward the vehicle rear side, the propeller shaft transmitting power to the rear wheel; and left and right battery units disposed on a vehicle lower side of left and right floor panels, the left and right floor panels being disposed on a vehicle left side and a vehicle right side of the floor tunnel, in which the propeller shaft has a first shaft portion and a second shaft portion that are arranged in sequence from a vehicle front side, the first shaft portion being connected to the gear box, the second shaft portion being connected to the first shaft portion via a joint portion, each of the left and right battery units has an inner side surface portion that extends along an inner wall portion of the floor tunnel and faces an inner side in a vehicle width direction, and a planar protector that covers a portion of the inner side surface portion is mounted to each of the left and right battery units, the portion being located on the vehicle rear side of the joint portion.

According to the first aspect, when the gearbox moves backward at the time of a front collision of the vehicle, the propeller shaft bends starting from the joint portion, whereby the gearbox can move backward smoothly. In this case, the joint portion with which the bending starts may be disadvantageously displaced to the left and right while moving backward.

As a measure against this, according to the first aspect, the contact between the joint portion and the battery units can be suppressed by covering the portion located on the vehicle rear side of the joint portion with the protector. This can satisfactorily protect the left and right battery units without interfering with the backward movement of the gearbox.

In addition, according to a second aspect of the present disclosure, the protector may include a plate portion that extends in a vehicle front-rear direction and a vehicle height direction, a first mount portion that is provided in a circumferential edge portion of the plate portion and connected to a vehicle body structural component of the vehicle, and a second mount portion that is provided in the circumferential edge portion of the plate portion and connected to one of the left and right battery units, and dimensions in the vehicle front-rear direction of the first mount portion and the second mount portion may be smaller than a dimension in the vehicle front-rear direction of the plate portion.

According to the second aspect described above, the left and right battery units can be protected more reliably by setting the dimension of the plate portion of the protector that suppresses contact with the battery units to be relatively larger. In contrast, the weight of the protectors can be reduced advantageously by setting the dimensions of the first mount portion and the second mount portion to be relatively smaller. This can reduce the weight of the protectors as much as possible while ensuring the protection performance for the battery units.

In addition, according to a third aspect of the present disclosure, the plate portion may be provided with a bead portion that extends in the vehicle front-rear direction.

According to the third aspect described above, the bending of the plate portion about the central axis that extends in the vehicle height direction can be suppressed advantageously by providing the bead portion that extends in the vehicle front-rear direction in the plate portion.

In addition, according to a fourth aspect of the present disclosure, the plate portion may include two planar bodies stacked in the vehicle width direction, the bead portion may be provided on each of the two planar bodies, the bead portion on one planar body of the two planar bodies may be a first bead portion that projects toward the inner side in the vehicle width direction, the one planar body being located on an inner side in the vehicle width direction, the bead portion on one planar body of the two planar bodies may be a second bead portion that projects toward the outer side in the vehicle width direction, the one planar body being located on an outer side in the vehicle width direction, and the first bead portion and the second bead portion may be disposed so as to face each other.

According to the fourth aspect described above, the first bead portion and the second bead portion define a closed cross section when seen in a cross section orthogonal to the vehicle front-rear direction. With this structure, bending of the plate portion about the central axis that extends in the vehicle height direction can be further suppressed advantageously.

In addition, according to a fifth aspect of the present disclosure, the circumferential edge portion of the plate portion may be bent toward the inner side in the vehicle width direction, and the first mount portion and the second mount portion may be formed integrally with the bent circumferential edge portion of the plate portion.

According to the fifth aspect described above, the distortion of the plate portion can be suppressed by bending the circumferential edge portion of the plate portion. In addition, the deformation of the first and the second mount portions can be suppressed advantageously by forming the first mount portion and the second mount portion in the portion bent in this way.

In addition, according to a sixth aspect of the present disclosure, the propeller shaft may be disposed above the left and right battery units in the vehicle height direction when seen in a cross section passing through at least the protector, each of the left and right battery units may be configured by fastening a pair of upper and lower case members, the case members may be formed in box shapes having openings that are open toward a vehicle upper side or the vehicle lower side and have a flanges provided along circumferential edges of the openings, the case members may be fastened to each other by inserting fasteners into the flanges, and the protector may extend upward from each of the flanges.

According to the sixth aspect described above, the protector is configured to extend upward from the flange for connecting the case members to each other. With this structure, the flange can be used as the mounting position of the protector while the battery units are protected by the protector. This can lay out the protector more appropriately while ensuring the protection performance for the battery units. In addition, a protector that is easier to mold can be used by configuring the protector so as to extend from the flange. This contributes to the improvement of the moldability of the protector.

Advantage of the Disclosure

As described above, according to some embodiments of the present disclosure, the left and right battery units can be satisfactorily protected without interfering with the backward movement of the gearbox.

MODES FOR CARRYING OUT THE DISCLOSURE

An embodiment of the present disclosure will be described below with reference to the drawings. It should be noted that the following description is an example.

Figure 1:
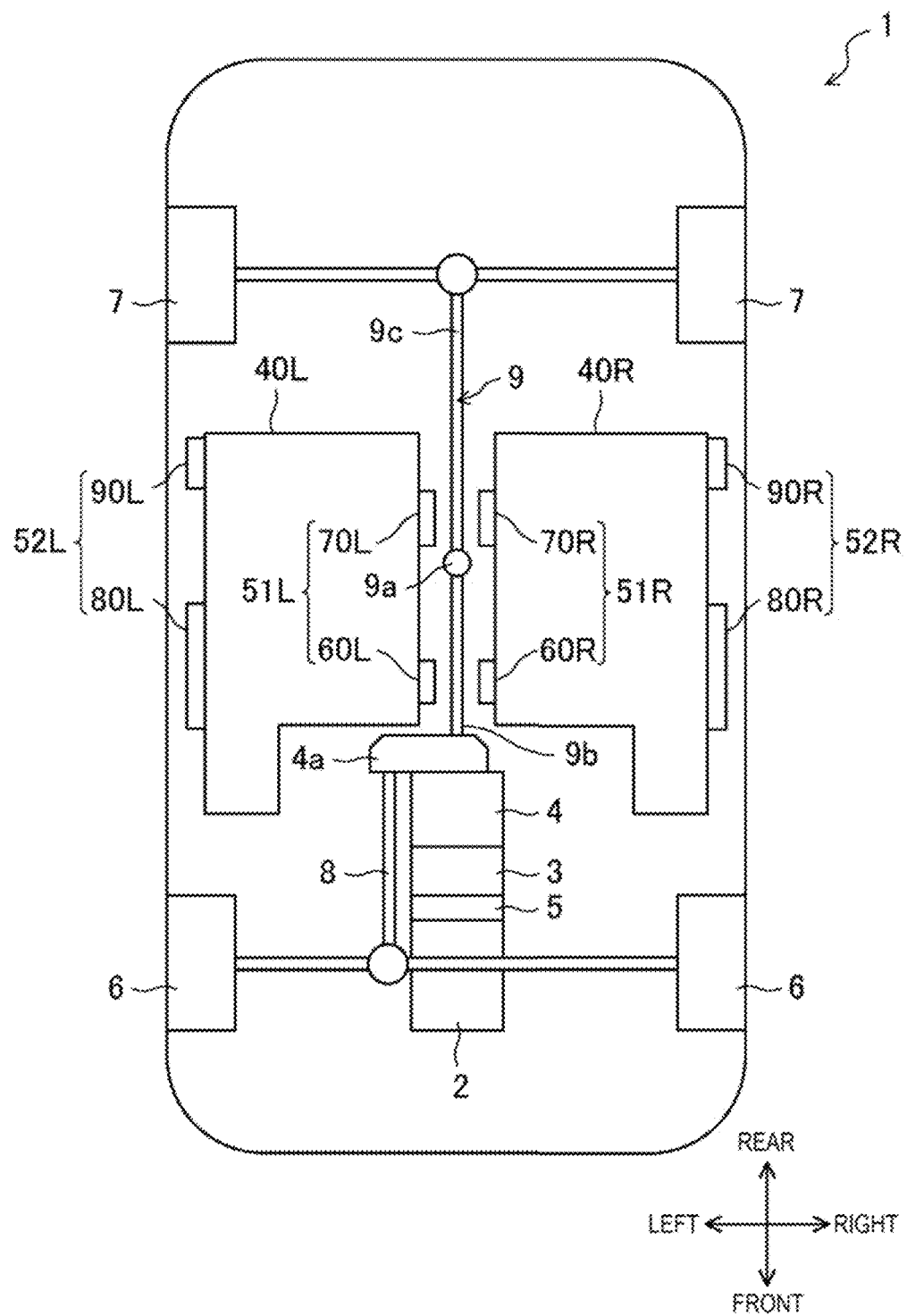
FIG. 1 is a schematic diagram illustrating a driving system of a vehicle to which a lower structure of a vehicle according to one embodiment of the present disclosure has been applied.
Figure 2:
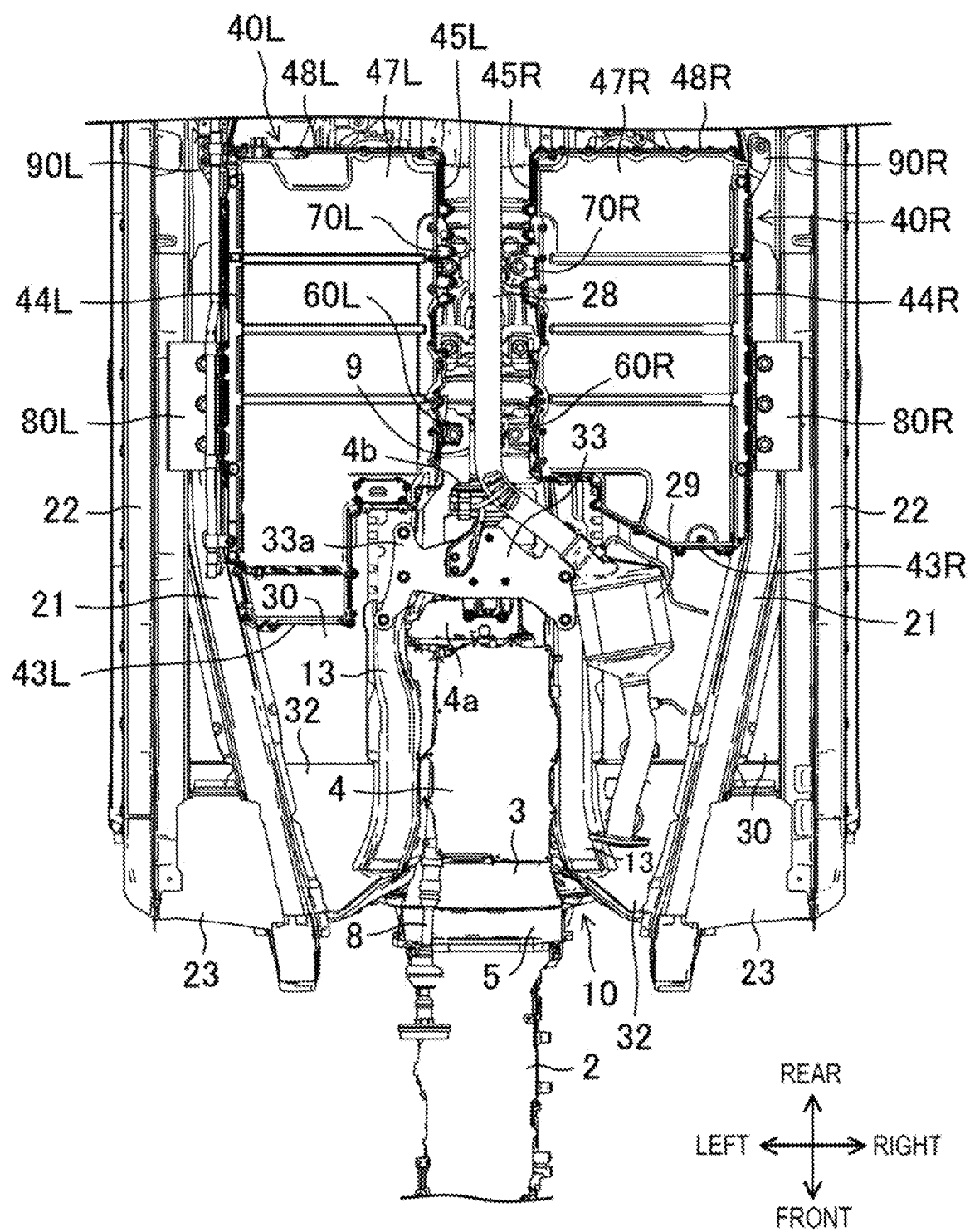
FIG. 2 is a bottom view illustrating the structure of a vehicle front side as seen from below according to one embodiment of the present disclosure.

FIG. 1 is a schematic diagram illustrating a driving system of a vehicle 1 to which a lower structure of a vehicle according to one embodiment of the present disclosure has been applied. In addition, FIG. 2 is a bottom view illustrating the structure of a front side portion of the vehicle 1 as seen from below according to one embodiment of the present disclosure.

It should be noted that the terms "front", "rear", "upper", and "lower" in the following description are defined with reference to the vehicle 1. That is, in the following description, "front" refers to the front side in the vehicle front-rear direction and "rear" refers to the rear side in the vehicle front-rear direction. Similarly, "upper" refers to the upper side in the vehicle height direction and "lower" refers to the lower side in the vehicle height direction. In the following description, the vehicle front-rear direction may be simply referred to as the "front-rear direction", the vehicle height direction may be simply referred to as the "up-down direction", and the vehicle width direction may be simply referred to as the "left-right direction".

In addition, the terms "left" and "right" in the following description are also defined with reference to the vehicle 1. That is, in the following description, "left" refers to the left side in the vehicle width direction when the vehicle 1 is seen from the rear side to the front side, and "right" refers to the right side when the vehicle 1 is seen from the rear side to the front side.

(Overall Structure)

The vehicle 1 illustrated in FIG. 1 may be a hybrid vehicle. Optionally, as illustrated in FIG. 1, the vehicle 1 includes an engine 2 and a motor 3 as drive sources (power trains) and a transmission 4 that changes the speed of a driving force transmitted from at least one of the engine 2 and the motor 3 and transmits the driving force. The engine 2 is housed in an engine room disposed in front of a vehicle interior. The engine 2 is vertically mounted at a substantially middle position in the vehicle width direction in the engine room. The motor 3 is disposed behind the engine 2 via a damper 5. The transmission 4 is vertically mounted behind the motor 3.

The vehicle 1 has at least left and right rear wheels 7 as driving wheels. In one embodiment, the vehicle 1 is configured as a four-wheel-drive vehicle that has left and right front wheels 6 and the left and right rear wheels 7 as driving wheels. The rear portion of the transmission 4 is a transfer 4a that transmits the driving force to the front wheels 6 and the rear wheels 7. A front propeller shaft 8 extends toward the front side from the transfer 4a. A rear propeller shaft 9 extends toward the rear side from the transfer 4a. The front propeller shaft 8 is disposed slightly to the right of the middle in the vehicle width direction. The rear propeller shaft 9 is disposed substantially in the middle in the vehicle width direction. Although not described in detail, the driving force changed in speed by the transmission 4 is transmitted to the front propeller shaft 8 and the rear propeller shaft 9 via the transfer 4a. The front propeller shaft 8 transmits the driving force to the front wheels 6 and the rear propeller shaft 9 transmits the driving force to the rear wheels 7. The rear propeller shaft 9 is an example of the "propeller shaft" in the embodiment.

As illustrated in FIG. 2, in one embodiment, the transmission 4 is disposed with at least the portion thereof on the vehicle rear side present in a floor tunnel 10. More specifically, the transmission 4 is disposed so as to be inclined to the lower side from the front side toward the rear side.

Figure 3:
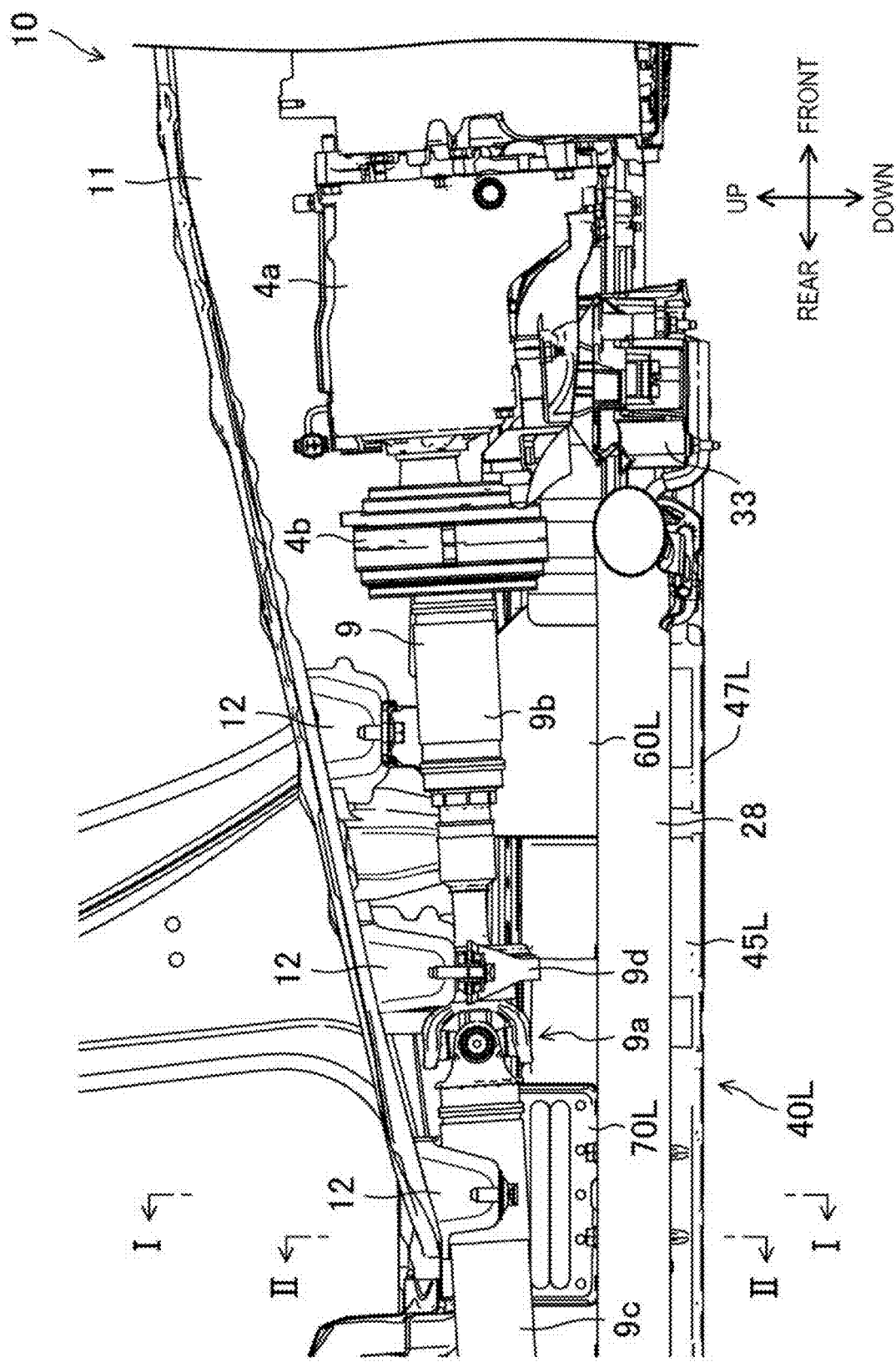
FIG. 3 is a diagram illustrating the structure inside a floor tunnel as seen from a vehicle right side according to one embodiment of the present disclosure.

The floor tunnel 10 is formed by a tunnel panel 11. As illustrated in FIG. 3, the upper end portion of the tunnel panel 11 is inclined to the lower side from the front side toward the rear side. Accordingly, the floor tunnel 10 is narrower in the up-down direction toward the rear side.

The rear propeller shaft 9 is disposed in the floor tunnel 10. The rear propeller shaft 9 is connected to the transfer 4a via a rubber cup 4b. The rear propeller shaft 9 extends from the position of the rubber cup 4b toward the rear side while being inclined to the lower side. A universal joint 9a is provided at the middle position in the front-rear direction of the rear propeller shaft 9. The rear propeller shaft 9 bends in the up-down direction and the left-right direction starting from the universal joint 9a at the time of, for example, a front collision. The universal joint 9a is an example of the "joint portion" in the embodiment.

The rear propeller shaft 9 according to the embodiment is divided into two portions in the front-rear direction by the universal joint 9a. Specifically, the rear propeller shaft 9 has a first shaft portion 9b connected to the transmission 4 and a second shaft portion 9c connected to the first shaft portion 9b via the universal joint 9a that are arranged in sequence from the vehicle front side.

Another rubber cup is provided in front of the universal joint 9a of the rear propeller shaft 9. A support bracket 9d that supports the rear propeller shaft 9 is provided at the position of this rubber cup. The support bracket 9d has a U-shape that covers the rubber cup from below and the left and right end portions thereof are connected to an upper tunnel reinforcement 12 for reinforcement provided on the tunnel panel 11 with bolts.

Side tunnel reinforcements 13 that extend in the front-rear direction are provided in the left and right end portions of the tunnel panel 11, respectively. The side tunnel reinforcements 13 are members for reinforcing the tunnel panel 11. The side tunnel reinforcements 13 are connected to the inner portion of the tunnel panel 11 by welding so as to form closed cross sections between the side tunnel reinforcements 13 and the tunnel panel 11.

Figure 5:
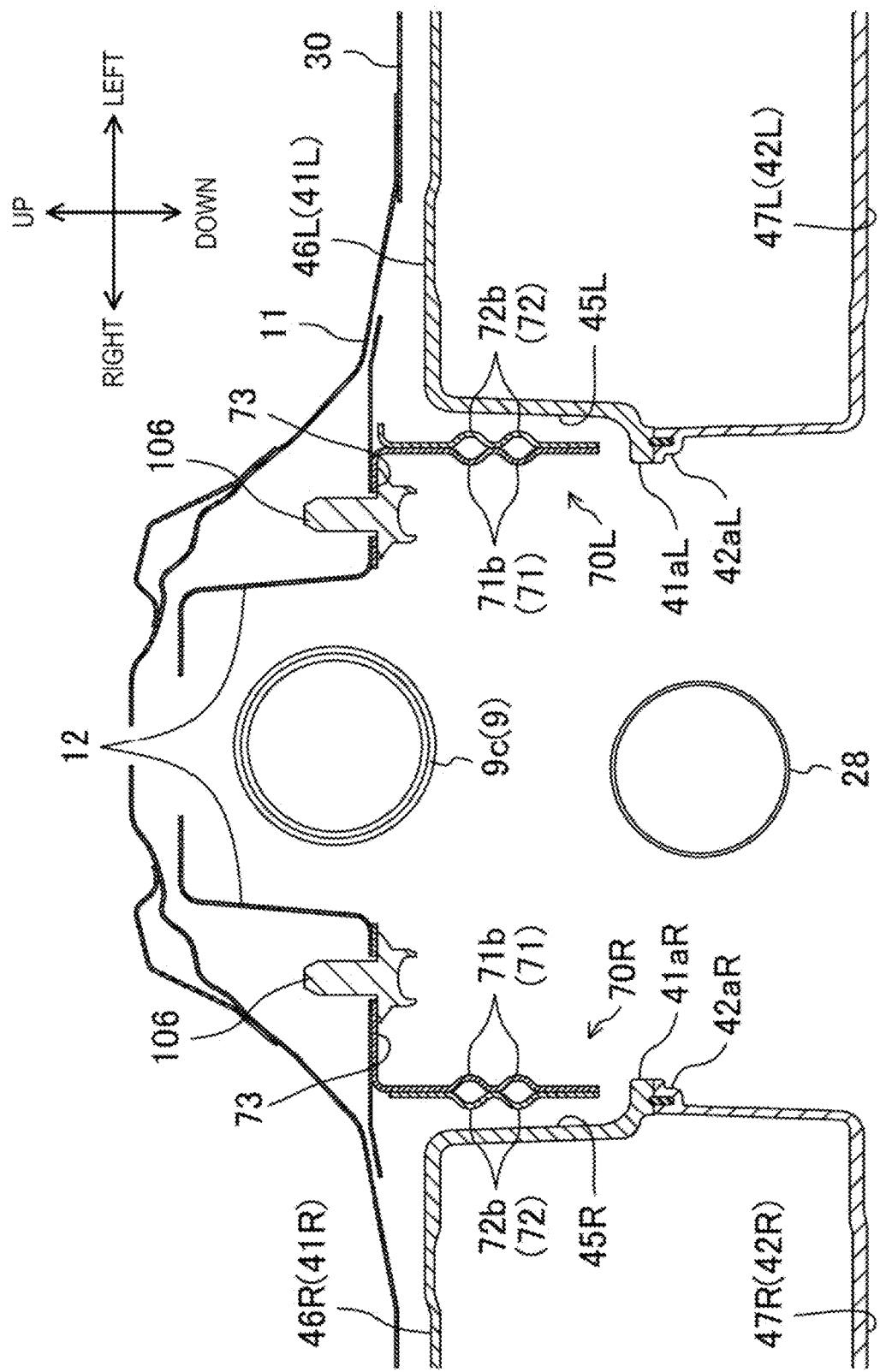
FIG. 5 is a sectional view illustrating a cross section taken along line I-I in FIG. 3 according to one embodiment of the present disclosure.

A pair of left and right floor panels 30 constituting the floor of the vehicle interior are disposed on the vehicle left side and the vehicle right side of the tunnel panel 11, respectively. The floor panels 30 extend horizontally in the front-rear direction and the left-right direction. As illustrated in FIG. 5, the right end portion of the left floor panel 30 is connected to the left end portion of the tunnel panel 11 by welding. Although not illustrated, the left end portion of the right floor panel 30 is connected to the right end portion of the tunnel panel 11 by welding. The left and right floor panels 30 are connected to each other in the left-right direction by the tunnel panel 11. The connection portions between the floor panels 30 and the tunnel panel 11 are located at the same positions as the connection portions between the tunnel panel 11 and the side tunnel reinforcements 13 or located on the outer side in the vehicle width direction of the connection portions between the tunnel panel 11 and the side tunnel reinforcements 13.

As illustrated in FIG. 2, in one embodiment, left and right toe boards 32 are connected to the front end portions of the left and right floor panels 30 by welding, respectively. The left and right toe boards 32 extend from the front end portions of the left and right floor panels 30 toward the front side while being inclined upward. The upper end portions of the left and right toe boards 32 are joined to the lower end portion of a dash panel (not illustrated) that separates the vehicle interior from the engine room. The right end portion of the left toe board 32 is connected to the left end portion of the tunnel panel 11 by welding. The left end portion of the right toe board 32 is connected to the right end portion of the tunnel panel 11 by welding.

As illustrated in FIG. 2, in one embodiment, a pair of left and right floor frames 21 that extend in the front-rear direction are connected to the lower surfaces of the left and right floor panels 30 and the lower surfaces of the left and right toe boards 32, respectively. The left and right floor frames 21 extend toward the rear side while being inclined to the outer side in the vehicle width direction so as to be separated from each other in the vehicle width direction, and then extend straight toward the rear side in parallel to each other.

As illustrated in FIG. 2, in one embodiment, a pair of left and right side sills 22 that extend in the front-rear direction are connected to the outer end portions in the vehicle width direction of the left and right floor panels 30. The left and right side sills 22 are located on the outer side in the vehicle width direction of the left and right floor frames 21. Although not illustrated, the left side sill 22 is connected to the left end portion of the left floor panel 30 by welding. The right side sill 22 is connected to the right end portion of the right floor panel 30 by welding.

As illustrated in FIG. 2, in one embodiment, the front end portions of the left and right floor frames 21 are connected to the front end portions of the left and right side sills 22 via left and right gussets 23, respectively.

As illustrated in FIGS. 1 and 2, in one embodiment, on the left and right sides of the floor tunnel 10 in the area behind the transfer 4a, left and right battery units 40L and 40R in which power for driving the motor 3 is stored are disposed. In particular, the battery units 40L and 40R according to the embodiment are disposed on the vehicle lower side of the floor panels 30 disposed on the vehicle left side of and the vehicle right side of the floor tunnel 10.

The left battery unit 40L is disposed below the passenger seat and the right battery unit 40R is disposed below the driver seat. The left and right battery units 40L and 40R are electrically connected to each other by a connector. The right end portion of the left battery unit 40L and the left end portion of the right battery unit 40R slightly overlap the floor tunnel 10 when seen from above or below in the up-down direction.

Both the left and right battery units 40L and 40R extend so as to pass through the position of the center of gravity of the vehicle 1 in the vehicle front-rear direction. Specifically, the position of the center of gravity of the vehicle 1 is located between the front end portions and the rear end portions of the left and right battery units 40L and 40R in the vehicle front-rear direction. Such disposition makes the positions of the centers of gravity of the left and right battery units 40L and 40R close to the position of the center of gravity of the vehicle 1 in the vehicle front-rear direction.

As illustrated in FIG. 2, in one embodiment, a transmission support member 33 that supports the transfer 4a (that is, the transmission 4) is provided slightly in front of the left and right battery units 40L and 40R. The transmission support member 33 is disposed so as to face a left front surface portion 43L and a right front surface portion 43R of the left and right battery units 40L and 40R.

As illustrated in FIG. 2, in one embodiment, an exhaust pipe 28 through which the exhaust gas from the engine 2 passes is disposed on the right side of the transmission support member 33. The exhaust pipe 28 extends from the engine 2 toward the floor tunnel 10 through the right side of the transmission 4 and the transmission support member 33, passes through the floor tunnel 10, and extends toward the rear side. The exhaust pipe 28 has an exhaust gas purification device 29 on the right side of the transmission support member 33. The exhaust gas purification device 29 has a horizontally long elliptical shape and has an exhaust gas purification catalyst 29a therein. The exhaust pipe 28 enters the floor tunnel 10 through the space between the front surface portion 43R of the right battery unit 40R and the transmission support member 33 at the same height as the front surface portion 43R of the right battery unit 40R and the transmission support member 33.

Next, the peripheral structures of the left battery unit 40L and the right battery unit 40R will be described in detail.
(Structure Concerning the Left Battery Unit 40L)

Figure 4:
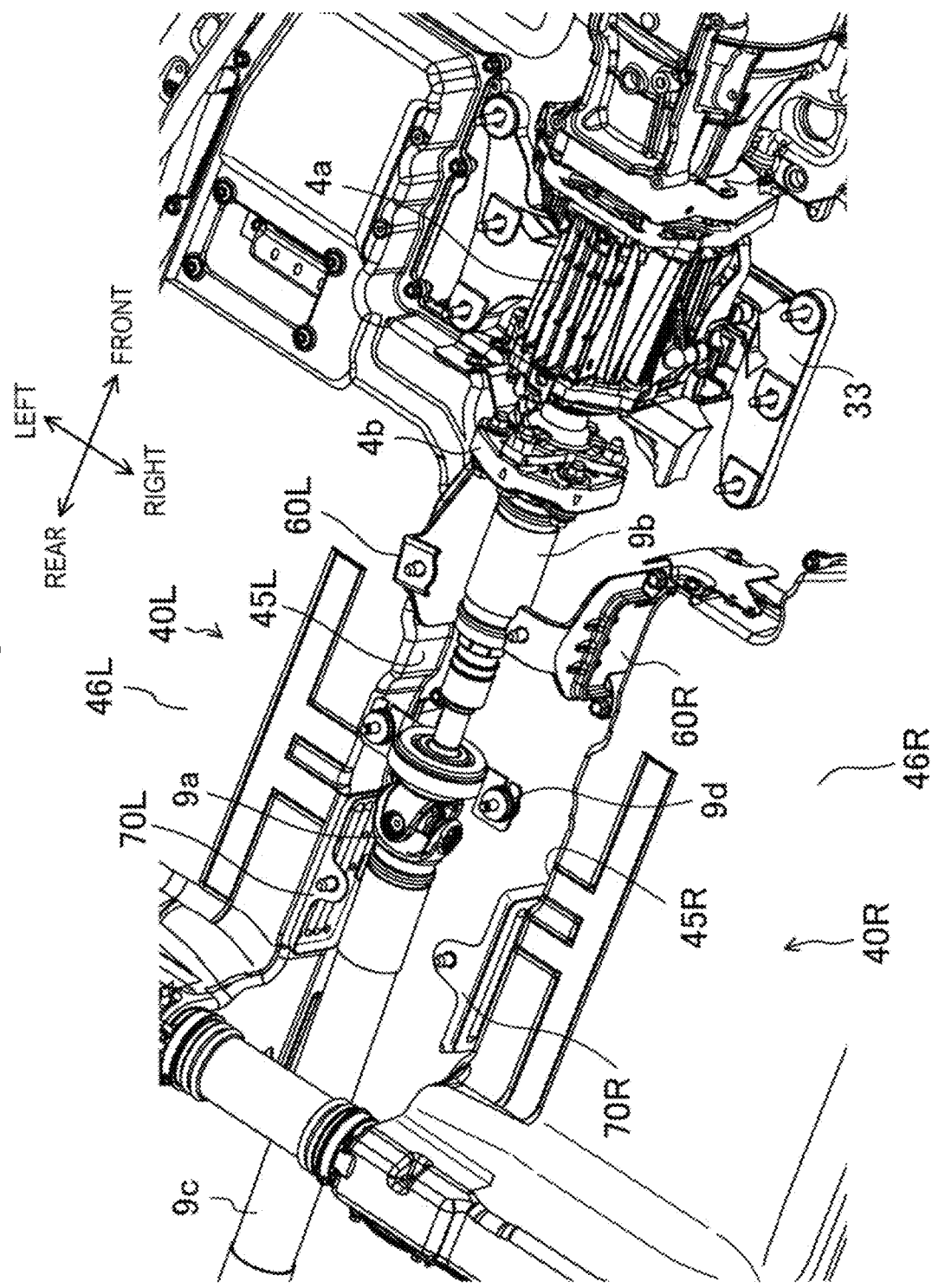
FIG. 4 is a perspective view illustrating the peripheral structure of battery units as seen from diagonally above according to one embodiment of the present disclosure.

First, the peripheral structure of the left battery unit 40L will be described. As illustrated in FIGS. 2 and 4, in one embodiment, the left battery unit 40L has a box shape and is substantially rectangular in bottom view.

Optionally, the left battery unit 40L includes the left front surface portion 43L, a left outer side surface portion 44L that extends in the front-rear direction from the outer end portion in the vehicle width direction of the left front surface portion 43L, a left inner side surface portion 45L that extends in the front-rear direction from the inner end portion in the vehicle width direction of the left front surface portion 43L, a left upper surface portion 46L that spreads horizontally from the upper end portion of the left front surface portion 43L toward the vehicle rear side, a left lower surface portion 47L that spreads from the lower end portion of the left front surface portion 43L so as to face the left upper surface portion 46L in the up-down direction, and a left rear surface portion 48L that faces the left front surface portion 43L in the front-rear direction. Of these, the left inner side surface portion 45L extends along the inner wall portion (the left inner side surface of the tunnel panel 11) of the floor tunnel 10 and faces the inner side (right side) in the vehicle width direction.

The edges of the surface portions 43L to 48L of the left battery unit 40L are integrated with each other. The inner portion in the vehicle width direction of the left front surface portion 43L is located behind the outer portion in the vehicle width direction. This forms a space in which the transmission support member 33 is disposed while the left battery unit 40L is made as large as possible.

Figure 6:
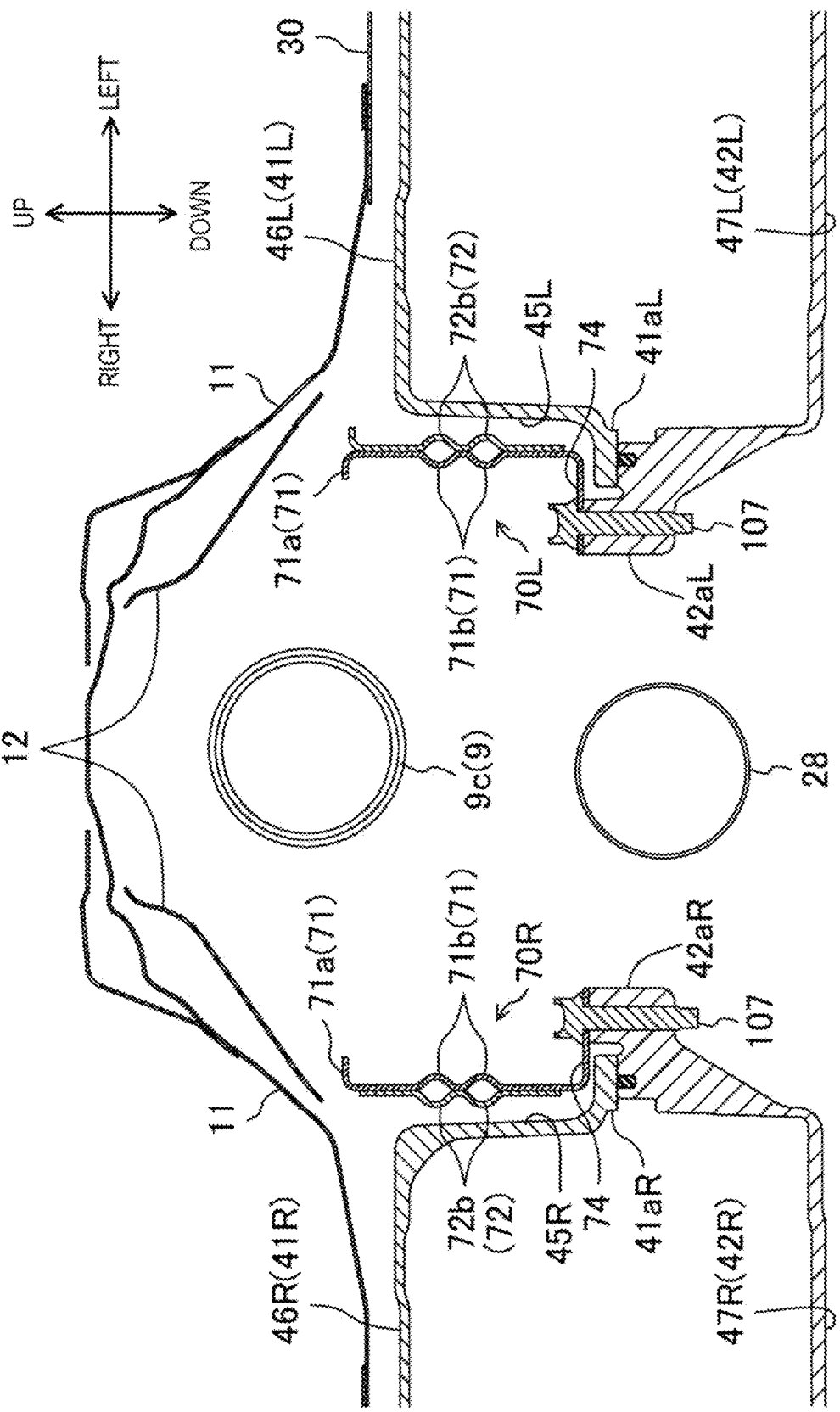
FIG. 6 is a sectional view illustrating a cross section taken along line II-II in FIG. 3 according to one embodiment of the present disclosure.

In addition, the left battery unit 40L according to the embodiment is configured by fastening a pair of upper and lower case members. Specifically, as illustrated in FIGS. 5 and 6, the left battery unit 40L has a first left case 41L and a second left case 42L divided in the up-down direction. The first left case 41L is a case member including the left upper surface portion 46L and is located relatively upward. The second left case 42L is a case member including the left lower surface portion 47L and is located relatively downward.

The first left case 41L and the second left case 42L are formed in box shapes having openings that are open toward the vehicle upper side or the vehicle lower side and have flanges 41aL and 42aL provided along the circumferential edges of the openings. Specifically, the first left case 41L has the flange 41aL that extends along the edge in the lower end portion thereof and the second left case 42L has the flange 42aL that extends along the edge in the upper end portion thereof.

The first left case 41L and the second left case 42L as case members can be fastened to each other by inserting a bolt (fastener) into the flanges 41aL and 42aL. Specifically, the first left case 41L and the second left case 42L are connected to each other by the bolt with the flanges 41aL and 42aL thereof abutting against each other in the up-down direction. A sealing member is disposed in the contact portion between the first left case 41L and the second left case 42L.

The left battery unit 40L is connected to the vehicle structural component via a plurality of mount brackets 51L and 52L. The mount brackets 51L and 52L according to the embodiment are mounted to the left outer side surface portion 44L that faces the outer side (left side) in the vehicle width direction of the left battery unit 40L and the left inner side surface portion 45L that faces the inner side (right side) in the vehicle width direction of the left battery unit 40L, respectively.

Optionally, the left outer bracket 52L as a mount bracket is mounted to the left outer side surface portion 44L of the left battery unit 40L (see FIGS. 1 to 6). This left outer bracket 52L connects the left battery unit 40L to the floor panel 30. Similarly, the left inner bracket 51L as a mount bracket is mounted to the left inner side surface portion 45L of the left battery unit 40L (see FIGS. 1 to 6). This left inner bracket 51L connects the left battery unit 40L to the tunnel panel 11.

The plurality of left outer brackets 52L are spaced apart from each other in the vehicle front-rear direction. Here, the left outer bracket 52L according to the embodiment includes at least a first left outer bracket 80L that extends in the vehicle front-rear direction.

Optionally, the left outer bracket 52L according to the embodiment includes the first left outer bracket 80L described above and a second left outer bracket 90L disposed behind the first left outer bracket 80L in the vehicle front-rear direction.

Of these, the first left outer bracket 80L extends in the vehicle front-rear direction so as to pass through the position of the center of gravity of the left battery unit 40L in the vehicle front-rear direction. Specifically, the front end portion of the first left outer bracket 80L is disposed on the vehicle front side of the position of the center of gravity of the left battery unit 40L, and the rear end portion of the first left outer bracket 80L is disposed on the vehicle rear side of the center of gravity of the left battery unit 40L. In the example illustrated in FIG. 2, the first left outer bracket 80L is mounted to the middle position in the front-rear direction of the left outer side surface portion 44L.

Although not illustrated, the lower portion of the first left outer bracket 80L is mounted to the second left case 42L with bolts. The upper end portion of the first left outer bracket 51L is fixed to the lower surface of the left floor frame 21 with bolts.

In contrast, the second left outer bracket 90L is mounted to the position of the rear end of the left outer side surface portion 44L. Although not illustrated, the lower portion of the second left outer bracket 90L is mounted to the second left case 42L with bolts. The upper end portion of the second left outer bracket 90L is fixed to the lower surface of the left floor frame 21 with bolts.

The plurality of left inner brackets 51L are spaced apart from each other in the vehicle front-rear direction. Here, the left inner bracket 51L according to the embodiment includes a first left inner bracket 60L and a second left inner bracket 70L that is disposed side-by-side with the first left inner bracket 60L in the vehicle front-rear direction and is located on the vehicle rear side of the first left inner bracket 60L.

Of these, the first left inner bracket 60L is disposed on the vehicle front side of the universal joint 9a and is disposed closer to the transmission 4 than the second left inner bracket 70L. More specifically, the first left inner bracket 60L is disposed closer to the position of the center of gravity of the left battery unit 40L in the vehicle front-rear direction than the second left inner bracket 70L. This makes the first left inner bracket 60L closer to the first left outer bracket 80L in the vehicle front-rear direction than the second left outer bracket 90L. In the example illustrated in FIG. 2, the first left inner bracket 60L is configured to cover the front side portion of the left inner side surface portion 45L from the inner side in the vehicle width direction.

The first left inner bracket 60L serves as a mount bracket for connecting the left battery unit 40L to the vehicle body structural component and also serves as a protector that covers the left inner side surface portion 45L from the inner side in the vehicle width direction. The first left inner bracket 60L is the member that prevents the transfer 4a from coming into contact with the left inner side surface portion 45L of the left battery unit 40L when the transmission 4 enters the floor tunnel 10 together with the transfer 4a at the time of a front collision. The second left inner protector 70L is made of, for example, cast iron.

The second left inner bracket 70L is disposed on the vehicle rear side of the universal joint 9a. In addition, as illustrated in FIG. 3, the second left inner bracket 70L is closer to the universal joint 9a than the first left inner bracket 60L in the vehicle front-rear direction. As illustrated in FIG. 2, the first left inner bracket 60L is disposed at the middle position between the first left outer bracket 80L and the second left outer bracket 90L in the vehicle front-rear direction.

The second left inner bracket 70L is configured as a planar protector that covers the portion of the left inner side surface portion 45L located on the vehicle rear side of the universal joint 9a. The second left inner bracket 70L functions if the rear propeller shaft 9 bends in the left-right direction starting from the universal joint 9a when the transmission 4 enters the floor tunnel 10 together with the transfer 4a at the time of a front collision. In this case, the second left inner bracket 70L exerts the function as a member for suppressing the contact between the universal joint 9a and the left inner side surface portion 45L of the left battery unit 40L. The second left inner protector 70L is made from, for example, a high-tensile steel plate component.

As illustrated in FIGS. 3 and 4, in one embodiment, the dimension in the vehicle front-rear direction of the second left inner bracket 70L is larger than the dimension in the vehicle front-rear direction of the universal joint 9a. In addition, as illustrated in FIG. 6, the dimension in the vehicle height direction of the second left inner bracket 70L is larger than the length of the side surface portion of the left inner side surface portion 45L defined by the first left case 41L on the upper side.

Optionally, as illustrated in FIGS. 5 to 8, the second left inner bracket 70L as a protector includes plate portions 71 and 72 that extend in the vehicle front-rear direction and the vehicle height direction, a first mount portion 73 provided in a circumferential edge portion 71a of the plate portion 71 and connected to the vehicle body structural component (more specifically, the tunnel panel 11) of the vehicle 1, and two second mount portions 74 and 74 provided in the circumferential edge portion 71a of the plate portion 71 and connected to the left battery unit 40L.

The plate portions 71 and 72 include two planar bodies stacked in the vehicle width direction. The first plate portion 71 located on the inner side in the vehicle width direction of the two planar bodies is formed in a rectangular shape having a larger dimension in the vehicle front-rear direction than in the vehicle height direction. The second plate portion 72 located on the outer side in the vehicle width direction of the two planar bodies is formed in a rectangular shape having substantially the same dimensions as the first plate portion 71. The first plate portion 71 and the second plate portion 72 are joined to each other by, for example, welding.

Each of the two planar bodies constituting the plate portions 71 and 72 is provided with a bead portion that extends in the vehicle front-rear direction. Specifically, the bead portion provided on the first plate portion 71 disposed on the inner side in the vehicle width direction of the two planar bodies forms a first bead portion 71b that projects toward the inner side in the vehicle width direction. This first bead portion 71b includes a plurality of bead shapes arranged in the up-down direction. As illustrated in FIGS. 5 and 6, the first bead portion 71b has a shape that extends in the vehicle front-rear direction and projects toward the inner side in the vehicle width direction. In other words, the first bead portion 71b has a concave cross section that is recessed toward the inner side in the vehicle width direction when seen in a cross section orthogonal to the vehicle front-rear direction.

In contrast, the bead portion provided in the second plate portion 72 located on the outer side in the vehicle width direction of the two planar bodies forms a second bead portion 72b that projects toward the outer side in the vehicle width direction. This second bead portion 72b includes a plurality of bead shapes disposed in the up-down direction. As illustrated in FIGS. 5 and 6, the second bead portion 72b has a shape that extends in the vehicle front-rear direction and projects toward the outer side in the vehicle width direction. In other words, the second bead portion 72b has a concave cross section that is recessed toward the outer side in the vehicle width direction when seen in a cross section orthogonal to the vehicle front-rear direction.

As illustrated in FIGS. 5 and 6, in one embodiment, the first bead portions 71*b* and the second bead portions 72*b* are disposed so as to face each other. Accordingly, the first bead portion 71*b* and the second bead portion 72*b* define a closed cross section that extends in the vehicle front-rear direction when seen in a cross section orthogonal to the vehicle front-rear direction.

In addition, the circumferential edge portion 71*a* of the first plate portion 71 is bent toward the inner side in the vehicle width direction along the contour of the first plate portion 71. Of the circumferential edge portion 71*a* of the first plate portion 71, the portion (the portion corresponding to the longer side located on the upper end side of the longer side of the rectangle corresponding to the first plate portion 71) located on the upper end side is provided integrally with the first mount portion 73. Of the circumferential edge portion 71*a* of the first plate portion 71, the portion (the portion corresponding to the longer side disposed on the lower end side of the longer side of the rectangle corresponding to the first plate portion 71) located on the lower end side is provided integrally with the second mount portions 74 and 74.

Figure 7:
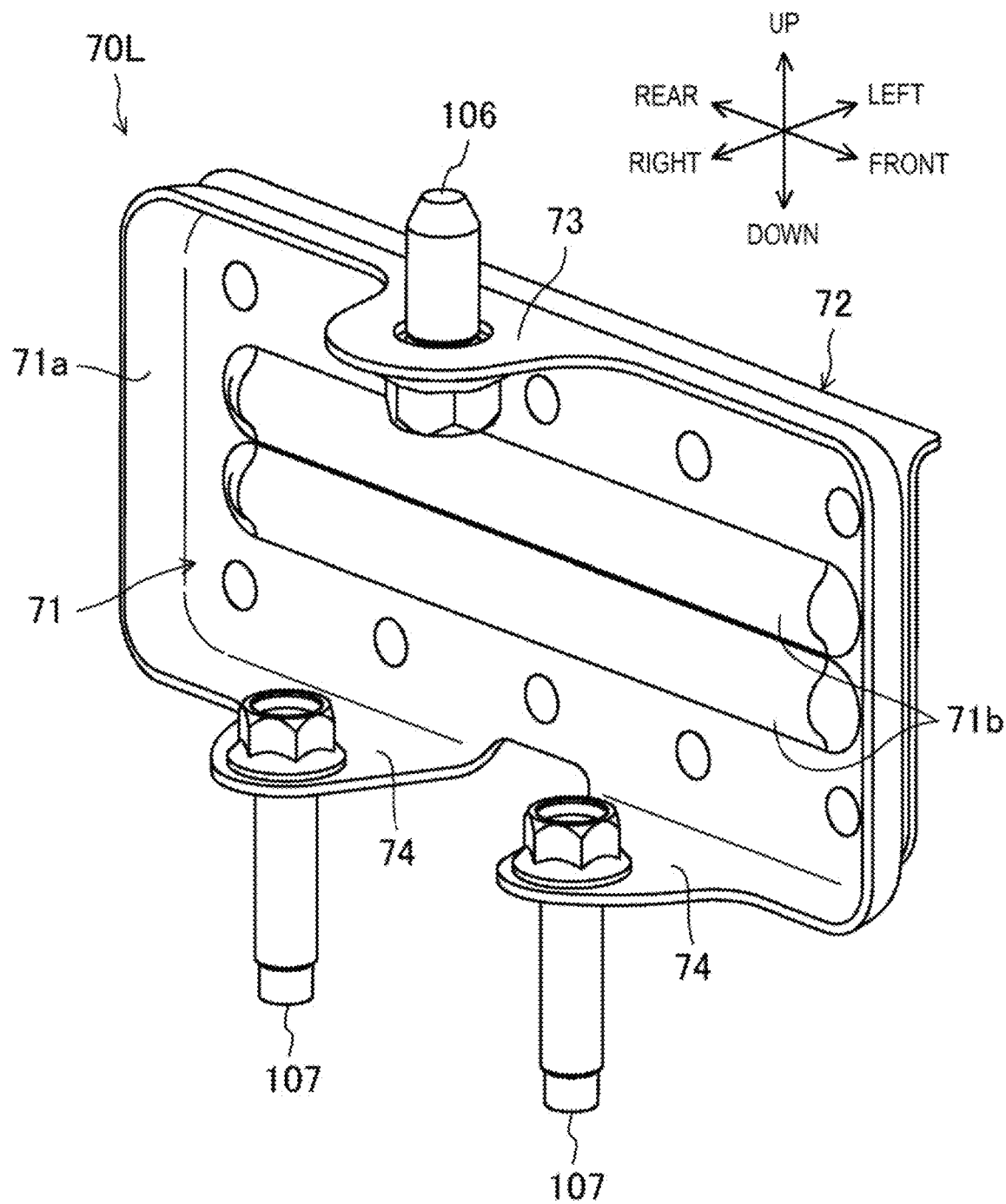
FIG. 7 is a perspective view illustrating a second left inner bracket as seen from an outer side in a vehicle width direction according to one embodiment of the present disclosure.

The first mount portion 73 is formed in a planar shape that extends toward the inner side in the vehicle width direction from the upper end portion of the first plate portion 71. The first mounting portion 73 is disposed at the middle position in the vehicle front-rear direction of the first plate portion 71. As illustrated in FIG. 5, the first mount portion 73 is fastened to the upper tunnel reinforcement 12 with bolts 106. This fastening connects the second left inner bracket 70L to the tunnel panel 11 via the upper tunnel reinforcement 12. In addition, as illustrated in FIG. 7 and the like, the dimension in the vehicle front-rear direction of the first mount portion 73 is smaller than the dimension in the vehicle front-rear direction of the first plate portion 71.

The second mount portions 74 and 74 are formed in planar shapes that extend toward the inner side in the vehicle width direction from the lower end portion of the first plate portion 71. The second mount portions 74 and 74 are disposed on the front side in the vehicle front-rear direction of the first plate portion 71 and on the rear side in the vehicle front-rear direction of the first plate portion 71, respectively. As illustrated in FIG. 6, the second mount portions 74 are fastened to the lower flange 42*a*L of the second left case 42L with bolts 107. This fastening mounts the second left inner bracket 70L to the left battery unit 40L via the flange 42*a*L. In addition, as illustrated in FIG. 7 and the like, the dimensions in the vehicle front-rear direction of the second mount portions 74 and 74 are smaller than the dimension in the vehicle front-rear direction of the first plate portion 71.

As illustrated in FIGS. 5 and 6, in one embodiment, the first mount portion 73 is connected to the tunnel panel 11 and the second mount portions 74 and 74 are connected to the left battery unit 40L, whereby the left battery unit 40L is supported by the vehicle body via the second left inner bracket 70L. A second right inner bracket 70R has both the function as a protector and the function as a mount bracket.

In addition, as illustrated in FIGS. 5 and 6, in one embodiment, when the first mount portion 73 is connected to the tunnel panel 11 and the second mount portions 74 and 74 are connected to the left battery unit 40L, the second left inner bracket 70L extends upward from the upper surface (the portion to which the second mount portions 74 and 74 are connected) of the lower flange 42*a*L to the lower surface (the portion to which the first mounting portion 73 is connected) of the upper tunnel reinforcement 12.

In this state, the upper end portion of the first plate portion 71 projects upward of the upper end portion (left upper surface portion 46L) of the left battery unit 40L (see FIG. 6) and covers, from the inner side, the side surface portion (particularly, the side surface portion of the left inner side surface portion 45L on the vehicle rear side of the universal joint 9*a*) defined by the first left case 41L on the upper side.

In addition, as illustrated in FIGS. 5 and 6, in one embodiment, the second shaft portion 9*c* of the rear propeller shaft 9 disposed on the vehicle rear side of the universal joint 9*a* is disposed above the left battery unit 40L in the vehicle height direction when seen in a cross section that passes through at least the first plate portion 71. The height positions of the upper end portion of the first plate portion 71 and the first mount portion 73 are set to a position that is higher than the lower end portion of the second shaft portion 9*c* and lower than the upper end portion of the second shaft portion 9*c* in the vehicle height direction.

In addition, as illustrated in FIGS. 5 and 6, in one embodiment, when the first mount portion 73 is connected to the tunnel panel 11 and the second mount portions 74 and 74 are connected to the left battery unit 40L, the height positions of the first bead portion 71*b* and the second bead portion 72*b* are set to the same height position as the side surface portion (particularly, the side surface portion on the vehicle rear side of the universal joint 9*a*) of the left inner side surface portion 45L defined by the first left case 41L on the upper side.

(Structure Concerning the Right Battery Unit 40R)

Next, the peripheral structure of the right battery unit 40R will be described. In the peripheral structure of the right battery unit 40R, the detailed shape is different from that of the left battery unit 40L, but the basic structure is symmetrical with respect to that of the left battery unit 40L. Accordingly, only the different portion between the peripheral structure of the right battery unit 40R and the peripheral structure of the left battery unit 40L will be described in detail and the same portion as the peripheral structure of the left battery unit 40L will not be described in detail as appropriate.

As illustrated in FIGS. 2 and 4, in one embodiment, the right battery unit 40R has a box shape and is substantially rectangular in bottom view. Specifically, the right battery unit 40R includes the right front surface portion 43R, a right outer side surface portion 44R that extends in the front-rear direction from the outer end portion in the vehicle width direction of the right front surface portion 43R, a right inner side surface portion 45R that extends in the front-rear direction from the inner end portion in the vehicle width direction of the right front surface portion 43R, a right upper surface portion 46R that spreads horizontally from the upper end portion of the right front surface portion 43R toward the vehicle rear side, a right lower surface portion 47R that spreads from the lower end portion of the right front surface portion 43R so as to face the right upper surface portion 46R in the up-down direction, and a right rear surface portion 48R that faces the right front surface portion 43R in the front-rear direction. Of these, the right inner side surface portion 45R extends along the inner wall portion (right inner side surface of the tunnel panel 11) of the floor tunnel 10 and faces the inner side (left side) in the vehicle width direction.

The edges of the surface portions 43R to 48R of the right battery unit 40R are integrated with each other. In the right front surface portion 43R, the inner portion in the vehicle width direction is located behind the outer portion in the vehicle width direction.

In addition, the right battery unit 40R according to the embodiment is configured by fastening the pair of upper and lower case members. Specifically, as illustrated in FIGS. 5 and 6, the right battery unit 40R includes a first right case 41R and a second right case 42R divided in the up-down direction. The first right case 41R is a case member including the right upper surface portion 46R and is located relatively on the upper side. The second right case 42R is a case member including the right lower surface portion 47R and is located relatively on the lower side.

In addition, the first right case 41R and the second right case 42R are formed in box shapes having openings that are open toward the vehicle upper side or the vehicle lower side and have flanges 41aR and 42aR provided along the circumferential edges of the openings, respectively. Specifically, the first right case 41R has the flange 41aR that extends along the edge in the lower end portion and the second right case 42R has the flange 42aR that extends along the edge in the upper end portion.

The first right case 41R and the second right case 42R as case members can be fastened to each other by inserting bolts (fasteners) into the flanges 41aR and 42aR. Specifically, the first right case 41R and the second right case 42R are connected to each other by bolts with the flanges 41aR and 42aR thereof abutting against each other in the up-down direction.

The right battery unit 40R is connected to the vehicle body structural component via a plurality of mount brackets 51R and 52R. The mount brackets 51R and 52R according to the embodiment are mounted to the right outer side surface portion 44R that faces the outer side (right side) in the vehicle width direction of the right battery unit 40R and the right inner side surface portion 45R that faces the inner side (left side) in the vehicle width direction of the right battery unit 40R, respectively.

Optionally, the right outer brackets 52R as the mount brackets are mounted to the right outer side surface portion 44R of the right battery unit 40R (see FIGS. 1 to 6). The right outer brackets 52R connect the right battery unit 40R to the floor panel 30. Similarly, the right inner brackets 51R as the mount brackets are mounted to the right inner side surface portion 45R of the right battery unit 40R (see FIGS. 1 to 6). The right inner brackets 51R connect the right battery unit 40R to the tunnel panel 11.

The plurality of right outer brackets 52R are spaced apart from each other in the vehicle front-rear direction. Here, the right outer bracket 52R according to the embodiment includes at least a first right outer bracket 80R that extends in the vehicle front-rear direction.

Optionally, the right outer bracket 52R according to the embodiment includes the first right outer bracket 80R described above and a second right outer bracket 90R disposed behind the first right outer bracket 80R in the vehicle front-rear direction. Since the first and second right outer brackets 80R and 90R have structures that are substantially reversed horizontally from those of the first and second left outer brackets 80L and 90L, the details thereof will not be described.

On the other hand, the plurality of right inner brackets 51R are spaced apart from each other in the vehicle front-rear direction. Here, the right inner bracket 51R according to the embodiment includes a first right inner bracket 60R and the second right inner bracket 70R that is disposed side-by-side with the first right inner bracket 60R in the vehicle front-rear direction and is located behind the first right inner bracket 60R.

Of these, the first right inner bracket 60R is disposed as a protector that covers the right inner side surface portion 45R from the inner side in the vehicle width direction. The first right inner bracket 60R is the member that prevents the transfer 4a from coming into contact with the right inner side surface portion 45R of the right battery unit 40R when the transmission 4 enters the floor tunnel 10 together with the transfer 4a at the time of a front collision. The right inner protector 70R is made of, for example, cast iron.

The second right inner bracket 70R is disposed so as to face the second left inner bracket 70L in the vehicle width direction. The second right inner bracket 70R is disposed on the vehicle rear side of the universal joint 9a as in the second left inner bracket 70L.

The second right inner bracket 70R is configured as a planar protector that covers the portion of the right inner side surface portion 45R located on the vehicle rear side of the universal joint 9a. The second right inner bracket 70R functions if the rear propeller shaft 9 bends in the left-right direction starting from the universal joint 9a when the transmission 4 enters the floor tunnel 10 together with the transfer 4a at the time of a front collision. In this case, the second right inner bracket 70R exerts the function as a member for suppressing the contact between the universal joint 9a and the right inner side surface portion 45R of the right battery unit 40R. The right inner protector 70R is made from, for example, a high-tensile steel plate component.

As in the second left inner bracket 70L, the dimension in the vehicle front-rear direction of the second right inner bracket 70R is larger than the dimension in the vehicle front-rear direction of the universal joint 9a. In addition, as illustrated in FIG. 6, the dimension in the vehicle height direction of the second right inner bracket 70R is larger than the length of the side surface portion defined by the first left case 41R on the upper side of the right inner side surface portion 45R.

Optionally, as in the second left inner bracket 70L, the second right inner bracket 70R as a protector includes the plate portions 71 and 72 that extend in the vehicle front-rear direction and the vehicle height direction, the first mount portion 73 provided in the circumferential edge portion 71a of the plate portion 71 and connected to the vehicle body structural component (more specifically, the tunnel panel 11) of the vehicle 1, and the two second mount portions 74 and 74 provided in the circumferential edge portion 71a of the plate portion 71 and connected to the right battery unit 40R (see FIGS. 5 and 6). The details of the portions are the same as in the plate portions 71 and 72, the first mount portion 73, and the second mount portions 74 and 74 of the second left inner bracket 70L. These components have structures in which the portions of the second left inner bracket 70L are substantially reversed horizontally.

The plate portions 71 and 72 include two planar bodies stacked in the vehicle width direction. The first plate portion 71 located on the inner side in the vehicle width direction of the two planar bodies is formed in a rectangular shape having a larger dimension in the vehicle front-rear direction than in the vehicle height direction. The second plate portion 72 located on the outer side in the vehicle width direction of the two planar bodies is formed in a rectangular shape having substantially the same dimensions as the first plate portion 71.

Each of the two planar bodies constituting the plate portions 71 and 72 is provided with a bead portion that extends in the vehicle front-rear direction. Specifically, the bead portion provided on the first plate portion 71 located on the inner side in the vehicle width direction of the two planar bodies forms the first bead portion 71*b* that projects toward the inner side in the vehicle width direction. In contrast, the bead portion provided in the second plate portion 72 located on the outer side in the vehicle width direction of the two planar bodies forms the second bead portion 72*b* that projects toward the outer side in the vehicle width direction.

As illustrated in FIGS. 5 and 6, in one embodiment, the first bead portions 71*b* and the second bead portions 72*b* are disposed so as to face each other. Accordingly, the first bead portion 71*b* and the second bead portion 72*b* define a closed cross section that extends in the vehicle front-rear direction when seen in a cross section orthogonal to the vehicle front-rear direction.

In addition, the circumferential edge portion 71*a* of the first plate portion 71 is bent toward the inner side in the vehicle width direction along the contour of the first plate portion 71. The circumferential edge portion 71*a* is provided integrally with the first mount portion 73 and the second mount portions 74 and 74.

The first mount portion 73 is fastened to the upper tunnel reinforcement 12 with the bolts 106. This fastening connects the second left inner bracket 70L to the tunnel panel 11 via the upper tunnel reinforcement 12. The second mount portions 74 and 74 are fastened to the lower flange 42*a*L of the second left case 42L with the bolt 107. This fastening mounts the second left inner bracket 70L to the left battery unit 40L via the flange 42*a*L.

As in the second left inner bracket 70L, the first mount portion 73 is connected to the tunnel panel 11 and the second mount portions 74 and 74 are connected to the right battery unit 40R, whereby the right battery unit 40R is supported by the vehicle body via the second right inner bracket 70R. The second right inner bracket 70R has both the function as a protector and the function as a mount bracket.

In addition, as illustrated in FIGS. 5 and 6, in one embodiment, when the first mount portion 73 is connected to the tunnel panel 11 and the second mount portions 74 and 74 are connected to the right battery unit 40R, the second right inner bracket 70R extends upward from the upper surface (the portion to which the second mount portions 74 and 74 are connected) of the lower flange 42*a*R to the lower surface (the portion to which the first mount portion 73 is connected) of the upper tunnel reinforcement 12.

In this state, the upper end portion of the first plate portion 71 projects upward of the upper end portion (right upper surface portion 46R) of the right battery unit 40R (see FIG. 6) and covers, from the inner side, the side surface portion (particularly, the side surface portion on the vehicle rear side of the universal joint 9*a*) defined by the first right case 41R on the upper side of the right inner side surface portion 45R.

In addition, as illustrated in FIGS. 5 and 6, in one embodiment, when the first mount portion 73 is connected to the tunnel panel 11 and the second mount portions 74 and 74 are connected to the right battery unit 40R, the height positions of the first bead portion 71*b* and the second bead portion 72*b* are set to be the same as the height position of the side surface portion (particularly, the side surface portion on the vehicle rear side of the universal joint 9*a*) defined by the first right case 41R on the upper side of the right inner side surface portion 45R.

(Protection of the Battery Units at the Time of a Front Collision)

As described above, according to the embodiment, when the transmission 4 moves backward at the time of a front collision of the vehicle 1, the rear propeller shaft 9 bends starting from the universal joint 9*a*, whereby the transmission 4 moves backward smoothly. In this case, there is a concern that the universal joint 9*a* with which the bending starts may be displaced to the left and right while moving backward.

As a measure against this, according to the embodiment, the contact between the universal joint 9*a* and the left and right battery units 40L and 40R can be suppressed by covering the portion disposed on the vehicle rear side of the universal joint 9*a* with the second left inner bracket 70L and the second right inner bracket 70R as protectors as illustrated in FIG. 4. This can satisfactorily protect the left and right battery units 40L and 40R without interfering with the backward movement of the transmission 4.

Figure 8:
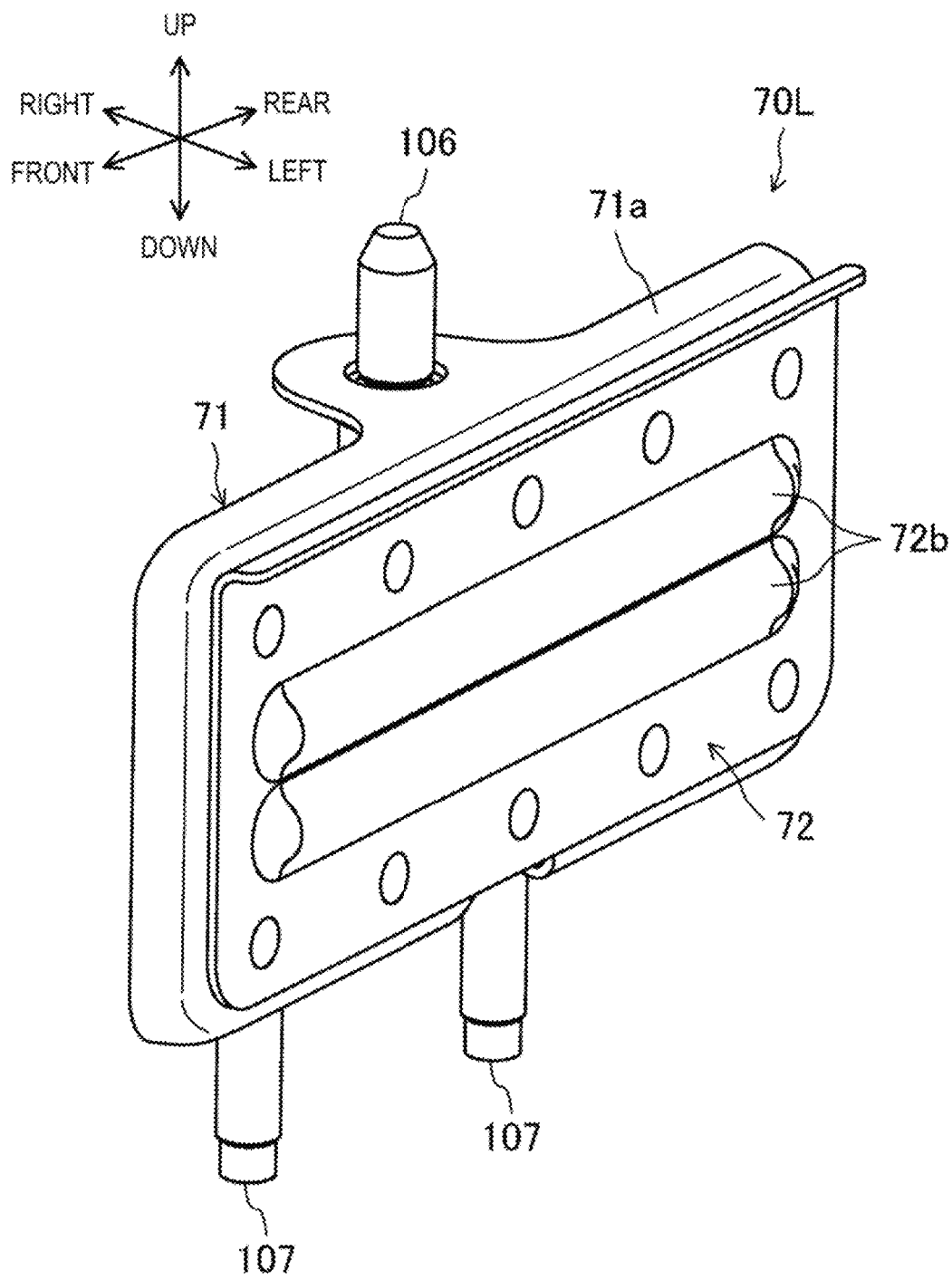
FIG. 8 is a perspective view illustrating the second left inner bracket as seen from an inner side in the vehicle width direction according to one embodiment of the present disclosure.

In addition, the left and right battery units 40L and 40R are protected more reliably by setting the dimension of the first plate portion 71 to be relatively larger than other components as illustrated in FIGS. 7 and 8. In contrast, the weights of the second left inner bracket 70L and the second right inner bracket 70R as protectors can be reduced advantageously by setting the dimensions of the first and second mount portions 73 and 74 to be relatively smaller. This can reduce the weights of the second left inner bracket 70L and the second right inner bracket 70R as much as possible while ensuring the protection performance for the battery units 40L and 40R.

In addition, as illustrated in FIGS. 7 and 8, in one embodiment, the bending of the first plate portion 71 about the central axis that extends in the vehicle height direction can be suppressed advantageously by providing the first bead portion 71*b* that extends in the vehicle front-rear direction in the first plate portion 71.

In addition, as illustrated in FIGS. 5 and 6, in one embodiment, the first bead portion 71*b* and the second bead portion 72*b* define a closed cross section when seen in a cross section orthogonal to the vehicle front-rear direction. With this structure, the bending of both the plate portions 71 and 72 about the central axis that extends in the vehicle height direction can be further suppressed advantageously.

In addition, the distortion of the first plate portion 71 can be suppressed by bending the circumferential edge portion 71*a* of the first plate portion 71 as illustrated in FIGS. 7 and 8. In addition, the deformation of the first and second mount portions 73 and 74 can be suppressed advantageously by forming the first and second mount portions 73 and 74 on the circumferential edge portion 71*a* bent as described above.

In addition, as illustrated in FIGS. 5 and 6, in one embodiment, the second left inner bracket 70L and the second right inner bracket 70R as protectors extend upward from the flanges 42*a*L and 42*a*R of the second left case 42L and the second right case 42R, respectively. With this structure, the flanges 42*a*L and 42*a*R can be used as the mount positions of the second left inner bracket 70L and the second right inner bracket 70R while the second left inner bracket 70L and the second right inner bracket 70R protect the left and right battery units 40L and 40R. This can lay out the second left inner bracket 70L and the second right inner bracket 70R more appropriately while ensuring the protection performance for the battery units 40L and 40R. In addition, protectors that are easier to mold can be used by configuring the protectors so as to extend from the flanges 42*a*L and 42*a*R. This contributes to the improvement of the moldability of the second left inner bracket 70L and the second right inner bracket 70R as protectors.

Other Embodiments

The technique disclosed herein is not limited to the embodiment described above and may be applied to other embodiments within the spirit of the claims.

For example, the vehicle 1 is a four-wheel-drive vehicle in the embodiment described above. However, the vehicle 1 is not limited to a four-wheel-drive vehicle and may be, for example, an FR vehicle. When the vehicle 1 is a FR vehicle, the transfer 4*a* and the front propeller shaft 8 are omitted. In addition, the vehicle 1 may be an electric vehicle that does not have the engine 2 but has only the motor 3 as the drive source.

The embodiment described above is only an example and the scope of the present disclosure should not be understood in a limited manner. The scope of the present disclosure is defined by the claims and all modifications and changes belonging to the equivalent scope of the claims fall within the scope of the present disclosure.

DESCRIPTION OF REFERENCE SIGNS AND NUMERALS

1: vehicle
2: engine
4: transmission (gearbox)
4*a*: transfer (gearbox)
7: rear wheel
9: rear propeller shaft (propeller shaft)
9*a*: universal joint (joint portion)
9*b*: first shaft portion
9*c*: second shaft portion
10: floor tunnel
11: tunnel panel
30: floor panel
40L: left battery unit (battery unit)
40R: right battery unit (battery unit)
41L: first left case (case member)
41R: first right case (case member)
41*a*L: flange
41*a*R: flange
42L: second left case (case member)
42R: second right case (case member)
42*a*L: flange
42*a*R: flange
45L: left inner side surface portion
45R: right inner side surface portion
51L: left inner bracket
51R: right inner bracket
70L: second left inner bracket (protector)
70R: second right inner bracket (protector)
71: first plate portion (plate portion)
71*a*: circumferential edge portion
71*b*: first bead portion (bead portion)
72: second plate portion (plate portion)
72*b*: second bead portion (bead portion)
73: first mount portion
74: second mount portion
107: fastener

The invention claimed is:

1. A lower structure of a vehicle in which a rear wheel serves as a drive wheel, the lower structure comprising:
a gearbox disposed with at least a portion of the gearbox present in a floor tunnel, the portion of the gearbox being present on a vehicle rear side;
a propeller shaft that extends from the gearbox toward the vehicle rear side, the propeller shaft transmitting power to the rear wheel; and
left and right battery units disposed on a vehicle lower side of left and right floor panels respectively, the left and right floor panels being disposed on a vehicle left side and a vehicle right side of the floor tunnel respectively,
wherein the propeller shaft has a first shaft portion and a second shaft portion that are arranged in sequence from a vehicle front side, the first shaft portion being connected to the gear box, the second shaft portion being connected to the first shaft portion via a joint portion,
each of the left and right battery units has an inner side surface portion that extends along an inner wall portion of the floor tunnel and faces an inner side in a vehicle width direction, and
a planar protector that covers a portion of the inner side surface portion of each of the left and right battery units is mounted to each of the left and right battery units, the portion of the inner side surface portion being located on the vehicle rear side of the joint portion,
wherein the planar protector includes a plate portion that extends in a vehicle front-rear direction and a vehicle height direction,
a first mount portion that is provided in a circumferential edge portion of the plate portion and connected to a tunnel panel of the vehicle, and
a second mount portion that is provided in the circumferential edge portion of the plate portion and connected to one of the left and right battery units, and
each of lengths of the first mount portion and the second mount portion in the vehicle front-rear direction is smaller than a length of the plate portion in the vehicle front-rear direction.

2. The lower structure of a vehicle according to claim 1, wherein the plate portion is provided with a bead portion that extends in the vehicle front-rear direction.

3. The lower structure of a vehicle according to claim 2, wherein the plate portion includes two planar bodies stacked in the vehicle width direction,
the bead portion is provided on each of the two planar bodies,
the bead portion on one planar body of the two planar bodies is a first bead portion that projects toward the inner side in the vehicle width direction, the one planar body being located on an inner side in the vehicle width direction,
the bead portion on another planar body of the two planar bodies is a second bead portion that projects toward the outer side in the vehicle width direction, the another planar body being located on an outer side in the vehicle width direction, and
the first bead portion and the second bead portion are disposed so as to face each other.

4. The lower structure of a vehicle according to claim 3, wherein the circumferential edge portion of the plate portion is bent toward the inner side in the vehicle width direction, and
the first mount portion and the second mount portion are formed integrally with the bent circumferential edge portion of the plate portion.

5. The lower structure of a vehicle according to claim 4, wherein the propeller shaft is disposed above the left and right battery units in the vehicle height direction when seen in a cross section passing through at least the planar protector,
each of the left and right battery units is configured by fastening a pair of upper and lower case members,
the pair of upper and lower case members have openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

6. The lower structure of a vehicle according to claim 1, wherein the propeller shaft is disposed above the left and right battery units in the vehicle height direction when seen in a cross section passing through at least the planar protector, each of the left and right battery units is configured by fastening a pair of upper and lower case members, the pair of upper and lower case members have openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

7. The lower structure of a vehicle according to claim 1, wherein the circumferential edge portion of the plate portion is bent toward the inner side in the vehicle width direction, and the first mount portion and the second mount portion are formed integrally with the bent circumferential edge portion of the plate portion.

8. The lower structure of a vehicle according to claim 2, wherein the circumferential edge portion of the plate portion is bent toward the inner side in the vehicle width direction, and the first mount portion and the second mount portion are formed integrally with the bent circumferential edge portion of the plate portion.

9. The lower structure of a vehicle according to claim 2, wherein the propeller shaft is disposed above the left and right battery units in the vehicle height direction when seen in a cross section passing through at least the planar protector, each of the left and right battery units is configured by fastening a pair of upper and lower case members, the pair of upper and lower case members have openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

10. The lower structure of a vehicle according to claim 3, wherein the propeller shaft is disposed above the left and right battery units in the vehicle height direction seen in a cross section passing through at least the planar protector, each of the left and right battery units is configured by fastening a pair of upper and lower case members, the pair of upper and lower case members have openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

11. The lower structure of a vehicle according to claim 7, wherein the propeller shaft is disposed above the left and right battery units in the vehicle height direction when seen in a cross section passing through at least the planar protector, each of the left and right battery units is configured by fastening a pair of upper and lower case members, the pair of upper and lower case members have openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

12. The lower structure of a vehicle according to claim 8, wherein the propeller shaft is disposed above the left and right battery units in the vehicle height direction when seen in a cross section passing through at least the planar protector, each of the left and right battery units is configured by fastening a pair of upper and lower case members, the pair of upper and lower case members having openings that are open toward a vehicle upper side or the vehicle lower side and have flanges provided along circumferential edges of the openings, the pair of upper and lower case members are fastened to each other by inserting fasteners into the flanges, and the planar protector extends upward from each of the flanges.

13. The vehicle comprising the lower structure of the vehicle according to claim 1.

14. The vehicle comprising the lower structure of the vehicle according to claim 5.

15. The vehicle comprising the lower structure of the vehicle according to claim 12.

* * * * *